US009651062B2

(12) United States Patent
Kobayashi

(10) Patent No.: US 9,651,062 B2
(45) Date of Patent: May 16, 2017

(54) CONSTRUCTION MACHINE AND CONTROLLER

(71) Applicant: KAYABA INDUSTRY CO., LTD., Tokyo (JP)

(72) Inventor: Masayuki Kobayashi, Kanagawa (JP)

(73) Assignee: KYB Corporation, Tokyo (JP)

( * ) Notice: Subject to any disclaimer, the term of this patent is extended or adjusted under 35 U.S.C. 154(b) by 224 days.

(21) Appl. No.: 14/405,535

(22) PCT Filed: Nov. 18, 2013

(86) PCT No.: PCT/JP2013/081059
§ 371 (c)(1),
(2) Date: Dec. 4, 2014

(87) PCT Pub. No.: WO2014/132495
PCT Pub. Date: Sep. 4, 2014

(65) Prior Publication Data

US 2015/0152890 A1 Jun. 4, 2015

(30) Foreign Application Priority Data

Feb. 28, 2013 (JP) ................................ 2013-038967

(51) Int. Cl.
*F16D 31/02* (2006.01)
*F15B 11/08* (2006.01)
(Continued)

(52) U.S. Cl.
CPC ............ *F15B 11/08* (2013.01); *E02F 9/2075* (2013.01); *E02F 9/2285* (2013.01); *E02F 9/2292* (2013.01); *E02F 9/2296* (2013.01); *F15B 11/17* (2013.01); *F15B 21/001* (2013.01); *F15B 21/08* (2013.01); *F15B 21/14* (2013.01); *F15B 2211/20546* (2013.01); *F15B 2211/20569* (2013.01); *F15B 2211/20576* (2013.01); *F15B 2211/30595* (2013.01); *F15B 2211/60* (2013.01); *F15B 2211/6316* (2013.01);
(Continued)

(58) Field of Classification Search
CPC ........ F15B 11/17; E02F 9/2292; E02F 9/2296
See application file for complete search history.

(56) References Cited

U.S. PATENT DOCUMENTS

| | | | |
|---|---|---|---|
| 2011/0035102 | A1 | 2/2011 | Kawasaki et al. |
| 2012/0233995 | A1 | 9/2012 | Kawasaki et al. |

FOREIGN PATENT DOCUMENTS

| | | | |
|---|---|---|---|
| JP | 2007-071197 | A | 3/2007 |
| JP | 2009-264024 | A | 11/2009 |

(Continued)

*Primary Examiner* — Michael Leslie
(74) *Attorney, Agent, or Firm* — Rabin & Berdo, P.C.

(57) ABSTRACT

A construction machine having an actuator that is driven by a working fluid includes a state value detection unit that detects a state value indicating an operating condition of the actuator, a mode determination unit that determines an operating mode by comparing the state value with a determination condition value, and a condition value setting unit that modifies the determination condition value on the basis of a comparison result of the mode determination unit. The condition value setting unit sets the determination condition value such that the determination condition value is increased when the state value falls below the determination condition value and decreased when the state value rises above the determination condition value.

5 Claims, 3 Drawing Sheets

(51) Int. Cl.

| | |
|---|---|
| ***F15B 11/17*** | (2006.01) |
| ***E02F 9/20*** | (2006.01) |
| ***E02F 9/22*** | (2006.01) |
| ***F15B 21/14*** | (2006.01) |
| ***F15B 21/00*** | (2006.01) |
| ***F15B 21/08*** | (2006.01) |

(52) U.S. Cl.
CPC ................. *F15B 2211/7053* (2013.01); *F15B 2211/7058* (2013.01); *F15B 2211/7135* (2013.01); *F15B 2211/7142* (2013.01); *F15B 2211/761* (2013.01)

(56) References Cited

FOREIGN PATENT DOCUMENTS

| | | | |
|---|---|---|---|
| JP | 2011-202458 | A | 10/2011 |
| JP | 2011-241948 | A | 12/2011 |

CONSTRUCTION MACHINE AND CONTROLLER

TECHNICAL FIELD

The present invention relates to a construction machine that drives an actuator using a working fluid, and a controller thereof.

BACKGROUND ART

JP2011-202458A discloses a hybrid construction machine including a variable capacity main pump that drives an actuator by discharging working oil, a sub pump that discharges working oil in order to assist an output of the main pump, a regenerative motor that rotates in order to perform regeneration upon reception of a working oil pressure, and a rotating electric machine driven by the regenerative motor. In this type of hybrid construction machine, the working oil discharged from the main pump is throttled by a throttle on a downstream side of a control valve, and a tilt angle of a swash plate of the main pump or the like is controlled (negatively controlled) in accordance with a working oil pressure (a pilot pressure) on an upstream side of the throttle.

SUMMARY OF INVENTION

In the hybrid construction machine described above, an operating mode of the construction machine is determined using the pilot pressure generated on the upstream side of the throttle, and assist control are executed by the sub pump in accordance with the determined operating mode.

However, even when the construction machine performs operations in a steady state, the detected pilot pressure includes a certain amount of variation. Hence, when the pilot pressure varies in the vicinity of a condition value for determining the operating mode while the construction machine continues to operate in a specific operating mode, either the specific operating mode or a different operating mode to the specific operating mode may be determined, depending on a detection timing of the pilot pressure. In this case, assist control corresponding to the different operating mode to the specific operating mode is executed such that assist control corresponding to an operation performed by an operator is not performed, and as a result, an operability of the hybrid construction machine deteriorates.

An object of the present invention is to provide a construction machine and a controller with which a deterioration in operability can be suppressed.

The present invention is a construction machine having an actuator that is driven by a working fluid, including a state value detection unit that detects a state value indicating an operating condition of the actuator, a mode determination unit that determines an operating mode by comparing the state value with a determination condition value, and a condition value setting unit that modifies the determination condition value on the basis of a comparison result of the mode determination unit. The condition value setting unit sets the determination condition value such that the determination condition value is increased when the state value falls below the determination condition value and decreased when the state value rises above the determination condition value.

DESCRIPTION OF EMBODIMENTS

Figure 1:
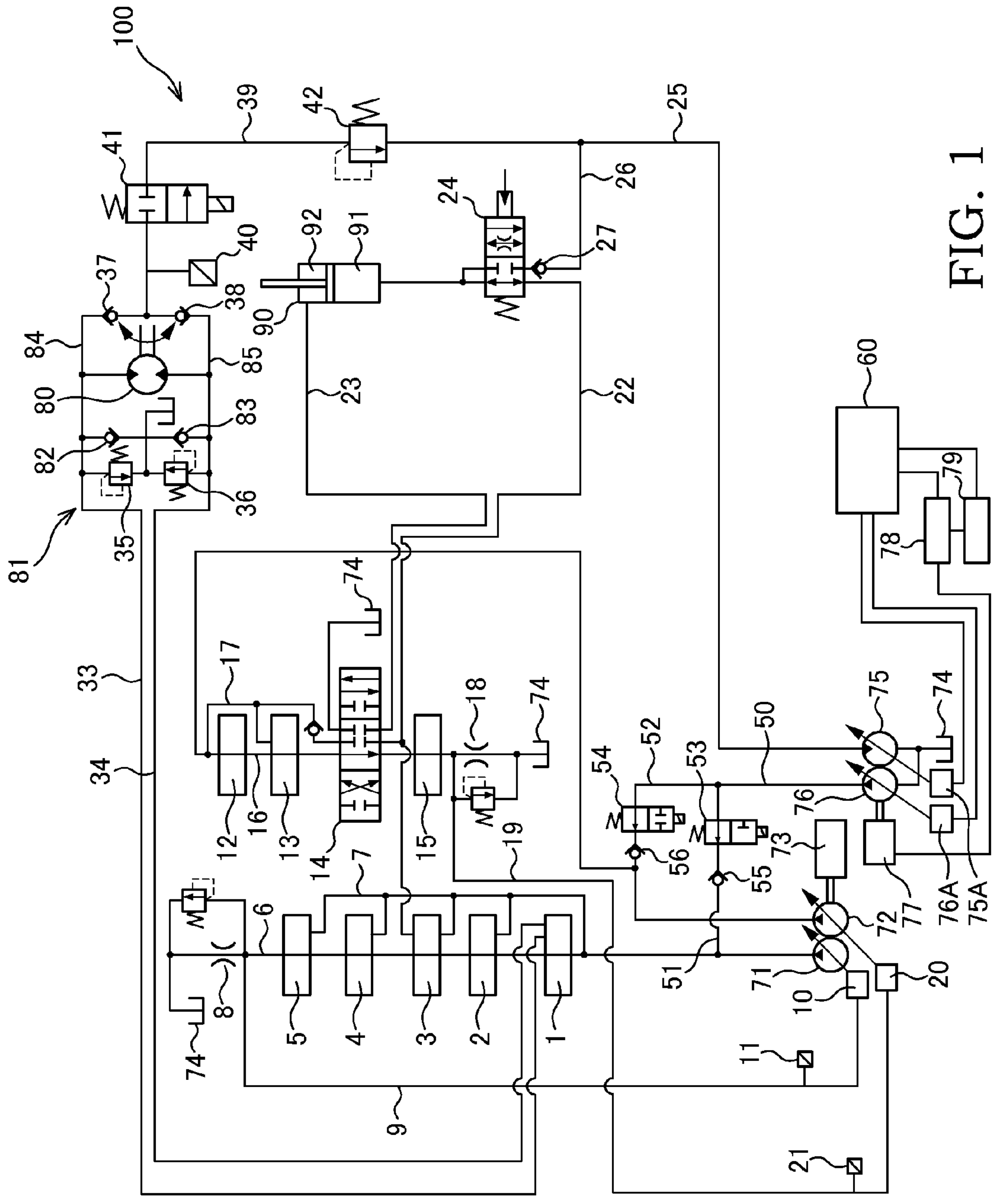
FIG. 1 is a schematic view showing a configuration of a control system for a hybrid construction machine according to an embodiment of the present invention.
Figure 2:
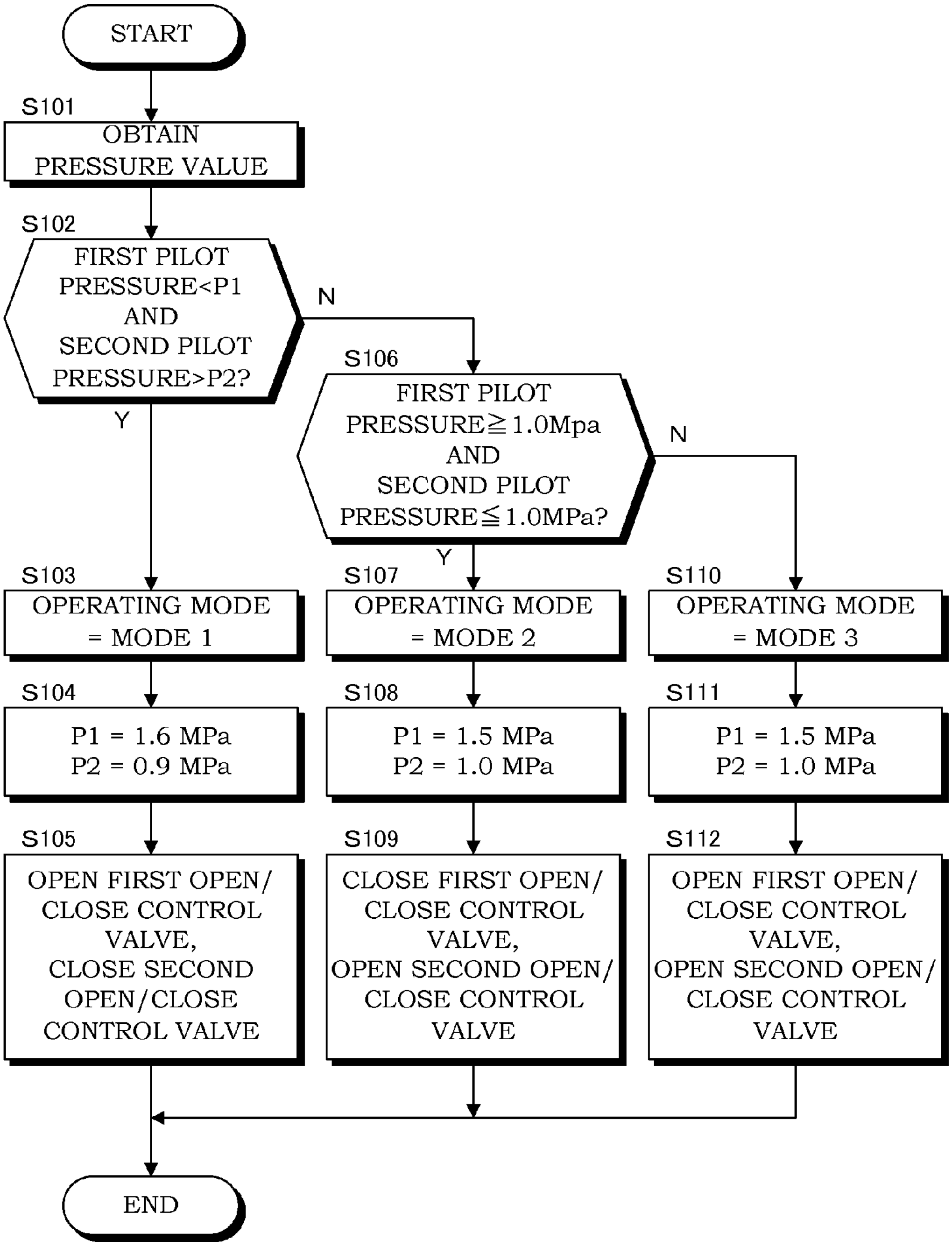
FIG. 2 is a flowchart showing operating mode determination control processing, which is executed by a controller carried in the hybrid construction machine.

Referring to FIGS. 1 and 2, a hybrid construction machine according to an embodiment of the present invention will be described below.

First, referring to FIG. 1, a control system 100 of the hybrid construction machine will be described.

The hybrid construction machine according to this embodiment is a hydraulic shovel, for example. The control system 100 of the hybrid construction machine includes a first main pump 71 and a second main pump 72 driven by power from an engine 73. The first main pump 71 and the second main pump 72 are variable capacity pumps having a capacity that can be adjusted in accordance with a tilt angle of a swash plate.

Working oil (a working fluid) discharged from the first main pump 71 is supplied to, in order from an upstream side, a control valve 1 that controls a turning motor 80, an arm first speed control valve 2 that controls an arm cylinder (not shown), a boom second speed control valve 3 that controls a boom cylinder 90, a control valve 4 that controls an auxiliary attachment (not shown), and a control valve 5 that controls a left side motor (not shown) for leftward travel. The respective control valves 1 to 5 control operations of respective actuators by adjusting a flow rate of the working oil led to the respective actuators from the first main pump 71. The respective control valves 1 to 5 are operated by a pilot pressure supplied thereto in response to a manual operation of an operating lever performed by an operator of the hybrid construction machine.

The respective control valves 1 to 5 are connected to the first main pump 71 via a neutral flow passage 6 and a parallel passage 7, which are disposed parallel to each other. A throttle 8 for generating a first pilot pressure is provided in the neutral flow passage 6 on a downstream side of the control valve 5. The throttle 8 generates the first pilot pressure to be steadily higher on an upstream side thereof as a flow rate of the working oil passing through increases, and to be steadily lower on the upstream side thereof as the flow rate of the working oil passing through decreases.

When all of the control valves 1 to 5 are in or in the vicinity of a neutral position, the neutral flow passage 6 leads all or a part of the working oil discharged from the first main pump 71 to a tank 74 (a storage portion). At this time, the flow rate of the working oil flowing through the throttle 8 is large, and therefore the generated first pilot pressure is high.

When the control valves 1 to 5 are switched to full stroke, on the other hand, the neutral flow passage 6 is closed such that substantially no working oil passes through the throttle 8, and as a result, the first pilot pressure is substantially zero.

In accordance with the operation amounts of the control valves 1 to 5, a part of the working oil discharged from the first main pump 71 is led to the actuators while the remainder is led from the neutral flow passage 6 to the tank 74. In this case, the throttle 8 generates the first pilot pressure in accordance with the flow rate of the working oil flowing through the neutral flow passage 6.

A pilot flow passage 9 is connected to the neutral flow passage 6 between the control valve 5 and the throttle 8, and the first pilot pressure generated on the upstream side of the throttle 8 is led to the pilot flow passage 9. A regulator 10 and a first pressure sensor 11 that detects the first pilot pressure in the pilot flow passage 9 are provided in the pilot flow passage 9.

The regulator 10 controls a displacement amount per unit rotation of the first main pump 71 by controlling the tilt angle of the swash plate of the first main pump 71 in inverse proportion to the first pilot pressure in the pilot flow passage 9. Accordingly, when the control valves 1 to 5 are switched to full stroke such that the first pilot pressure in the pilot flow passage 9 reaches zero, the tilt angle of the swash plate of the first main pump 71 reaches a maximum, thereby maximizing the displacement amount per unit rotation.

Working oil discharged from the second main pump 72 is supplied to, in order from the upstream side, a control valve 12 that controls a right side motor (not shown) for rightward travel, a control valve 13 that controls a bucket cylinder (not shown), a boom first speed control valve 14 that controls the boom cylinder 90, and an arm second speed control valve 15 that controls the arm cylinder (not shown). The respective control valves 12 to 15 control operations of respective actuators by adjusting the flow rate of the working oil led to the respective actuators from the second main pump 72. The respective control valves 12 to 15 are operated by a pilot pressure supplied thereto in response to a manual operation of the operating lever performed by the operator of the hybrid construction machine.

The respective control valves 12 to 15 are connected to the second main pump 72 via a neutral flow passage 16. Further, the control valve 13 and the control valve 14 are connected to the second main pump 72 via a parallel passage 17 disposed parallel to the neutral flow passage 16. A throttle 18 for generating a second pilot pressure is provided in the neutral flow passage 16 on a downstream side of the control valve 15. The throttle 18 functions identically to the throttle 8 on the first main pump 71 side.

A pilot flow passage 19 is connected to the neutral flow passage 16 between the control valve 15 and the throttle 18, and the second pilot pressure generated on the upstream side of the throttle 18 is led to the pilot flow passage 19. A regulator 20 and a second pressure sensor 21 that detects the second pilot pressure in the pilot flow passage 19 are provided in the pilot flow passage 19.

The regulator 20 controls the displacement amount per unit rotation of the second main pump 72 by controlling the tilt angle of the swash plate of the second main pump 72 in inverse proportion to the second pilot pressure in the pilot flow passage 19. Accordingly, when the control valves 12 to 15 are switched to full stroke such that the second pilot pressure in the pilot flow passage 19 reaches zero, the tilt angle of the swash plate of the second main pump 72 reaches a maximum, thereby maximizing the displacement amount per unit rotation.

Next, the turning motor 80 will be described.

The turning motor 80 is a hydraulic motor that turns an operator carrying portion (cabin) provided in an upper portion of the hybrid construction machine, and is disposed on a turning circuit 81. The turning circuit 81 includes a pair of supply/discharge passages 33, 34 connected to the control valve 1, and relief valves 35, 36 that are connected respectively to the supply/discharge passages 33, 34 so as to open at a set pressure.

When the control valve 1 is set in the neutral position, an actuator port of the control valve 1 is closed, and therefore working oil supply and discharge to and from the turning motor 80 is blocked. As a result, the turning motor 80 is held in a stopped condition.

When the control valve 1 is switched to a motor normal rotation position, the supply/discharge passage 33 is connected to the first main pump 71 and the supply/discharge passage 34 is connected to the tank 74. As a result, working oil is supplied through the supply/discharge passage 33 such that the turning motor 80 rotates normally, and return working oil from the turning motor 80 is discharged into the tank 74 through the supply/discharge passage 34.

When the control valve 1 is switched to a motor reverse rotation position, on the other hand, the supply/discharge passage 34 is connected to the first main pump 71 and the supply/discharge passage 33 is connected to the tank 74. As a result, working oil is supplied through the supply/discharge passage 34 such that the turning motor 80 rotates in reverse, and return working oil from the turning motor 80 is discharged into the tank 74 through the supply/discharge passage 33.

When a turning pressure of the supply/discharge passages 33, 34 reaches the set pressure of the relief valves 35, 36 as the turning motor 80 rotates, the relief valves 35, 36 open such that the working oil in the high pressure side passage is led into the low pressure side passage.

Further, when the control valve 1 is switched to the neutral position as the turning motor 80 rotates, the actuator port of the first control valve 1 is closed such that the turning circuit 81 forms a closed circuit. Even when the turning circuit 81 is closed in this manner, the turning motor 80 continues to rotate due to inertial energy. At this time, the pressure in the supply/discharge passage 33, 34 that was at low pressure before the actuator port of the control valve 1 was closed increases while the pressure in the other supply/discharge passage 33, 34 that was at high pressure decreases, and as a result, a braking force is applied to the turning motor 80. When a braking pressure in the supply/discharge passages 33, 34 reaches the set pressure of the relief valves 35, 36, the relief valves 35, 36 open such that the working oil in the high pressure side passage is led into the low pressure side passage.

It should be noted that when an intake flow rate of the turning motor 80 is insufficient during a braking operation, the working oil in the tank 74 is supplied to the turning motor 80 through check valves 82, 83 that allow the working oil to flow only from the tank 74 storing the working oil into the supply/discharge passages 33, 34.

Next, the boom cylinder 90 will be described.

An operation of the boom cylinder 90 is controlled by the control valve 14. The boom second speed control valve 3 is switched in conjunction with the control valve 14.

When the control valve 14 is switched from the neutral position shown in FIG. 1 to a right side position, the working oil discharged from the second main pump 72 is supplied to a piston side chamber 91 of the boom cylinder 90 through a supply/discharge passage 22, and return working oil from a rod side chamber 92 is discharged into the tank 74 through a supply/discharge passage 23. As a result, the boom cylinder 90 expands.

When the control valve 14 is switched from the neutral position shown in FIG. 1 to a left side position, the working oil discharged from the second main pump 72 is supplied to the rod side chamber 92 through the supply/discharge passage 23, and return working oil from the piston side chamber 91 is discharged into the tank 74 through the supply/discharge passage 22. As a result, the boom cylinder 90 contracts.

When the control valve 14 is in the neutral position, working oil supply and discharge to and from the boom cylinder 90 are blocked such that the boom cylinder 90 is held in a stopped condition. When the control valve 14 is switched to the neutral position in order to stop movement of the boom, a force is applied to the boom cylinder 90 in a contracting direction by the weight of the bucket, the arm, the boom, and so on. Accordingly, the piston side chamber 91 of the boom cylinder 90 functions as a load side pressure chamber that supports a load.

The control system 100 of the hybrid construction machine is configured to perform energy regeneration by collecting the energy of the working oil from the turning circuit 81 and the boom cylinder 90.

First, a regeneration system using the working oil from the turning circuit 81 will be described.

Branch passages 84, 85 are connected respectively to the supply/discharge passages 33, 34 connected to the turning motor 80. The branch passages 84, 85 converge on a turning regeneration passage 39 for leading the working oil from the turning circuit 81 to a regenerative motor 75. A check valve 37 that allows the working oil to flow only from the supply/discharge passage 33 to the turning regeneration passage 39 is provided in the branch passage 84, and a check valve 38 that allows the working oil to flow only from the supply/discharge passage 34 to the turning regeneration passage 39 is provided in the branch passage 85. The turning regeneration passage 39 is connected to the regenerative motor 75 via a converged regeneration passage 25.

The regenerative motor 75 is a variable capacity hydraulic motor having a swash plate with an adjustable tilt angle. The regenerative motor 75 is coupled to an electric motor 77 that also functions as a power generator so as to rotate coaxially therewith. When the electric motor 77 is caused to function as a power generator, power generated by the electric motor 77 is charged to a battery 79 via an inverter 78. The regenerative motor 75 and the electric motor 77 may be coupled directly or via a reduction gear.

A pressure sensor 40, a first regeneration control valve 41, and a pressure reduction valve 42 are provided in the turning regeneration passage 39 in order from the upstream side.

The pressure sensor 40 is disposed in the turning regeneration passage 39 between the first regeneration control valve 41 and the check valves 37, 38. The pressure sensor 40 detects the pressure of the working oil in the turning circuit 81. The first regeneration control valve 41 is a solenoid valve that opens and closes the turning regeneration passage 39 in accordance with the pressure detected by the pressure sensor 40.

The pressure reduction valve 42 is disposed in the turning regeneration passage 39 on the downstream side of the first regeneration control valve 41. The pressure reduction valve 42 is a valve member that operates to maintain a differential pressure between an inlet and an outlet at a fixed value. In a case where the first regeneration control valve 41 malfunctions or the like, the pressure reduction valve 42 prevents runaway in the turning motor 80 by maintaining the pressure in the supply/discharge passages 33, 34.

In the control system 100 of the hybrid construction machine, the first regeneration control valve 41 is opened when a predetermined turning regeneration condition is established, whereby the working oil from the turning circuit 81 is led into the regenerative motor 75 through the turning regeneration passage 39 and the converged regeneration passage 25. Accordingly, a rotary shaft of the electric motor 77 rotates synchronously with a rotary shaft of the regenerative motor 75, and as a result, power can be generated by the electric motor 77 and the generated power can be charged to the battery 79.

Next, a regeneration system using the working oil from the piston side chamber 91 of the boom cylinder 90 will be described.

A second regeneration control valve 24 for switching a flow of the working oil is provided in the supply/discharge passage 22 that connects the piston side chamber 91 of the boom cylinder 90 to the control valve 14 and a cylinder regeneration passage 26 for leading the working oil from the piston side chamber 91 to the regenerative motor 75.

The second regeneration control valve 24 is configured to be held in a normal position under normal circumstances, as shown in the figure, and to be switched to a regeneration position when a predetermined cylinder regeneration condition is established. A check valve 27 that allows the working to flow only from the piston side chamber 91 of the boom cylinder 90 to the regenerative motor 75 is provided in the cylinder regeneration passage 26 downstream of the second regeneration control valve 24.

When the second regeneration control valve 24 is in the normal position, the supply/discharge passage 22 is set in a communicative condition and the cylinder regeneration passage 26 is set in a blocked condition. Accordingly, the working oil is allowed to flow between the piston side chamber 91 of the boom cylinder 90 and the control valve 14.

When the second regeneration control valve 24 is switched to the regeneration position, on the other hand, the supply/discharge passage 22 and the cylinder regeneration passage 26 are both set in the communicative condition. The second regeneration control valve 24 is switched to the regeneration position when the boom cylinder 90 contracts, and in this case return working oil from the piston side chamber 91 of the boom cylinder 90 is distributed between the supply/discharge passage 22 and the cylinder regeneration passage 26. A flow rate of the working oil passing through the supply/discharge passage 22 and a flow rate of the working oil passing through the cylinder regeneration passage 26 are adjusted in accordance with an amount by which the second regeneration control valve 24 is switched.

In the control system 100 of the hybrid construction machine, the second regeneration control valve 24 is switched to the regeneration position when the predetermined cylinder regeneration condition is established, whereby the working oil from the piston side chamber 91 of the boom cylinder 90 is led to the regenerative motor 75 through the cylinder regeneration passage 26 and the converged regeneration passage 25. Accordingly, the rotary shaft of the electric motor 77 rotates synchronously with the rotary shaft of the regenerative motor 75, and as a result, power can be generated by the electric motor 77 and the generated power can be charged to the battery 79.

The control system 100 of the hybrid construction machine is configured to assist the output of the first main pump 71 and the second main pump 72 using a sub pump 76. Assist control using the sub pump 76 will be described.

The sub pump 76 is a variable capacity pump having a swash plate with an adjustable tilt angle. The sub pump 76 is coupled to the regenerative motor 75 and the electric motor 77 so as to rotate coaxially therewith. The sub pump 76 basically rotates on the basis of a driving force of the electric motor 77. A rotation speed of the electric motor 77 is controlled by a controller 60 via the inverter 78. Further, the tilt angles of the swash plates of the sub pump 76 and the regenerative motor 75 are controlled by the controller 60 via respective tilt angle controllers 76A, 75A.

A discharge passage 50 is connected to the sub pump 76. The discharge passage 50 is configured to bifurcate into a first assist passage 51 and a second assist passage 52. The first assist passage 51 converges with the neutral flow passage 6 on a discharge side of the first main pump 71. The second assist passage 52 converges with the neutral flow passage 16 on a discharge side of the second main pump 72.

A first open/close control valve 53, which is a solenoid valve that is open/close-controlled by the controller 60, is provided in the first assist passage 51. A second open/close control valve 54, which is a solenoid valve that is open/close-controlled by the controller 60, is provided in the second assist passage 52. A check valve 55 that allows the working oil to flow only from the sub pump 76 to the first main pump 71 side is provided in the first assist passage 51 downstream of the first open/close control valve 53. A check valve 56 that allows the working oil to flow only from the sub pump 76 to the second main pump 72 side is provided in the second assist passage 52 downstream of the second open/close control valve 54.

During the assist control, the first open/close control valve 53 and the second open/close control valve 54 are opened as required, and the sub pump 76 is driven by the electric motor 77. Accordingly, the working oil discharged from the sub pump 76 can be supplied to the discharge side of the first and second main pumps 71, 72 through the first and second assist passages 51, 52 to assist the output of the first and second main pumps 71, 72.

The hybrid construction machine control system 100 described above includes the controller 60 that controls and manages the entire system. The controller 60 is constituted by a microcomputer including a central processing unit (CPU), a read only memory (ROM), a random access memory (RAM), and an input/output interface (I/O interface).

The controller 60 determines an operating mode of the hybrid construction machine on the basis of the first and second pilot pressures detected by the first and second pressure sensors 11, 21, and executes assist control in accordance with the operating mode.

The operating mode includes a turning mode in which the operator carrying portion is turned by the turning motor 80, a bucket operating mode in which the bucket is operated by the bucket cylinder, an arm operating mode in which the arm is operated by the arm cylinder, a boom operating mode in which the boom is operated by the boom cylinder 90, a travel mode in which travel is performed using the left and right travel motors, and so on.

Referring to FIG. 2, operating mode determination control processing executed by the controller 60 of the hybrid construction machine will be described. The operating mode determination control processing is executed repeatedly at predetermined control period intervals while the hybrid construction machine is operative.

In a step 101 (S101), the controller 60 obtains the first pilot pressure detected by the first pressure sensor 11 and the second pilot pressure detected by the second pressure sensor 21. The first pilot pressure and the second pilot pressure are state values indicating operating conditions of the actuators of the construction machine. Thus, the controller 60 includes a state value detection unit that detects a state value.

In S102, the controller 60 determines whether or not the first pilot pressure is smaller than a first determination pressure value P1 (a determination condition value), and whether or not the second pilot pressure is larger than a second determination pressure value P2 (a determination condition value). 1.5 Mpa is set as an initial value of the first determination pressure value P1, and 1.0 Mpa is set as an initial value of the second determination pressure value P2.

When the first pilot pressure is smaller than the first determination pressure value P1 and the second pilot pressure is larger than the second determination pressure value P2, the controller 60 executes processing of S103, and in all other cases, the controller 60 executes processing of S106.

When the first pilot pressure is smaller than the first determination pressure value P1 and the second pilot pressure is larger than the second determination pressure value P2, the controller 60 determines in S103 that the current operating mode is a mode (MODE 1) in which the actuators are driven by the first main pump 71, such as the turning mode. Thus, the controller 60 includes a mode determination unit that determines whether the operating mode is MODE 1 (a specific operating mode) or another mode by comparing the first pilot pressure and second pilot pressure with the preset first determination pressure value P1 and second determination pressure value P2.

In S104, the controller 60 modifies the first determination pressure value P1 from its initial value of 1.5 MPa to 1.6 MPa, which serves as a first corrected condition value, and modifies the second determination pressure value P2 from its initial value of 1.0 MPa to 0.9 MPa, which serves as a second corrected condition value. By setting the first determination pressure value P1 to be larger than its initial value and setting the second determination pressure value P2 to be smaller than its initial value, the operating mode is less likely to be determined as an operating mode other than MODE 1 after being determined as MODE 1. Thus, the controller 60 includes a condition value setting unit (which may also be referred to as a determination pressure value setting unit) that sets, as the first determination pressure value P1 and the second determination pressure value P2, corrected condition values which are determined so that the operating mode is less likely to be determined as an operating mode other than MODE 1. In other words, the controller 60 (the condition value setting unit) sets the first determination pressure value P1 and the second determination pressure value P2 so as to provide hysteresis therein.

In S105, the controller 60 controls the first open/close control valve 53 to open and controls the second open/close control valve 54 to close in order to assist the output of the first main pump 71 using the sub pump 76. As a result, the working oil discharged from the sub pump 76 is supplied to the discharge side of the first main pump 71 through the first assist passage 51 to assist the output of the first main pump 71.

When it is determined in S102 that the first pilot pressure equals or exceeds the first determination pressure value P1 or that the second pilot pressure is equal to or smaller than the second determination pressure value P2, the controller 60 executes the processing of S106.

In S106, the controller 60 determines whether or not the first pilot pressure equals or exceeds 1.0 MPa and whether or not the second pilot pressure is equal to or smaller than 1.0 MPa. When the first pilot pressure equals or exceeds 1.0 MPa and the second pilot pressure is equal to or smaller than 1.0 MPa, the controller 60 executes processing of S107, and in all other cases, the controller 60 executes processing of S110.

In S107, the controller 60 determines that the current operating mode is a mode (MODE 2) in which the actuators are driven by the second main pump 72, such as the bucket operating mode.

In S108 following the processing of S107, the controller 60 modifies the first determination pressure value P1 to its initial value of 1.5 MPa, and modifies the second determination pressure value P2 to its initial value of 1.0 MPa. Thus, the controller 60 includes a condition value setting unit that returns the first determination pressure value P1 and the second determination pressure value P2 to their initial values.

In S109, the controller 60 controls the first open/close control valve 53 to close and controls the second open/close control valve 54 to open in order to assist the output of the second main pump 72 using the sub pump 76. As a result, the working oil discharged from the sub pump 76 is supplied to the discharge side of the second main pump 72 through the second assist passage 52 to assist the output of the second main pump 72.

When it is determined in S106 that the first pilot pressure is smaller than 1.0 MPa or that the second pilot pressure is larger than 1.0 MPa, the controller 60 executes the processing of S110.

In S110, the controller 60 determines that the current operating mode is a mode (MODE 3) in which the plurality of actuators are driven by the first main pump 71 and the second main pump 72, such as the travel mode.

In S111 following the processing of S110, the controller 60 modifies the first determination pressure value P1 to its initial value of 1.5 MPa, and modifies the second determination pressure value P2 to its initial value of 1.0 MPa. The processing of S111 is identical to the processing of S108.

In S112, the controller 60 controls both the first open/close control valve 53 and the second open/close control valve 54 to open in order to assist the output of the first main pump 71 and the second main pump 72 using the sub pump 76. As a result, the working oil discharged from the sub pump 76 is supplied to the respective discharge sides of the first main pump 71 and the second main pump 72 through the first assist passage 51 and the second assist passage 52 to assist the output of the first main pump 71 and the second main pump 72.

Actions and effects of the operating mode determination control processing executed by the controller 60 will be described.

Here, a case in which the turning mode is set in response to a turning operation instruction from the operator, the first pilot pressure is 0.5 MPa, and the second pilot pressure is 1.05 MPa will be described.

Since the first pilot pressure is 0.5 MPa and the second pilot pressure is 1.05 MPa, the controller 60 determines in S101 to S103 that the operating mode of the hybrid construction machine is MODE 1. The controller 60 then modifies the first determination pressure value P1 and the second determination pressure value P2 to the first corrected condition value and the second corrected condition value in S104, and opens the first open/close control valve 53 in S105 to assist the output of the first main pump 71.

While the turning operation is underway, the detected first pilot pressure and second pilot pressure vary within a certain range due to vibration generated by the operator when controlling the operating lever and so on, rather than remaining at fixed values. It was determined in an experiment performed in advance that the first pilot pressure and second pilot pressure vary by approximately ±0.1 MPa about a center value. Hence, when the center value of the first pilot pressure is 0.5 MPa, the first pilot pressure is detected as 0.5 MPa±0.1 MPa, and when the center value of the second pilot pressure is 1.05 MPa, the second pilot pressure is detected as 1.05 MPa±0.1 MPa.

When the operating mode determination control processing is executed again following the predetermined control period interval, the first pilot pressure and the second pilot pressure are at 0.4 MPa and 0.95 MPa, respectively, due to the effect of the pressure variation described above. In S102, therefore, the controller 60 determines the operating mode on the basis of the pressure variation-affected first pilot pressure and second pilot pressure.

If the first determination pressure value P1 and the second determination pressure value P2 are maintained at their initial values in S102, when the first pilot pressure and second pilot pressure are 0.4 MPa and 0.95 MPa, respectively, the controller 60 determines erroneously through the processing of S102 and S106 that the current operating mode is MODE 3, even though in actuality the operating mode is still MODE 1.

In this embodiment, however, when MODE 1 is determined in the previous operating mode determination control processing, the first determination pressure value P1 is relaxed from 1.5 MPa (a first threshold) serving as the initial value to 1.6 MPa (a second threshold) serving as the first corrected condition value, and the second determination pressure value P2 is relaxed from 1.0 MPa (a second threshold) serving as the initial value to 0.9 MPa (a first threshold) serving as the second corrected condition value, and as a result, an operating mode other than MODE 1 is less likely to be determined. Hence, even when the first pilot pressure and the second pilot pressure shift to 0.4 MPa and 0.95 MPa, respectively, during the turning operation due to the effect of pressure variation, the controller 60 can correctly determine that the current operating mode is MODE 1.

With the hybrid construction machine according to this embodiment, the first determination pressure value P1 and the second determination pressure value P2 are set so as to provide hysteresis therein after initially determining that the operating mode is MODE 1, and therefore erroneous determination of the operating mode due to pressure variation in the first pilot pressure and second pilot pressure is suppressed. Hence, a different mode to the actual operating mode is not determined, and therefore the assist control can be executed in accordance with the operation performed by the operator on the basis of the correctly determined operating mode. As a result, the operability of the hybrid construction machine can be prevented from deteriorating.

Further, in the hybrid construction machine according to this embodiment, the first determination pressure value P1 and the second determination pressure value P2 are returned to their initial values when, after determining that the operating mode is MODE 1 and setting the first determination pressure value P1 and the second determination pressure value P2 at the first corrected condition value and the second corrected condition value, the operating mode is shifted on the basis of an operation performed by the operator such that the operating mode is determined to be MODE 2 or MODE 3. By returning the first determination pressure value P1 and the second determination pressure value P2 to their initial values in this manner, a situation in which the operating mode remains unlikely to be determined as an operating mode other than MODE 1 can be prevented.

The first corrected condition value of the first determination pressure value P1 is set to be larger than the initial value of the first determination pressure value P1, and the second corrected condition value of the second determination pressure value P2 is set to be smaller than the initial value of the second determination pressure value P2. The first corrected condition value and the second corrected condition value, or more specifically a difference between the initial value of the first determination pressure value P1 and the first corrected condition value and a difference between the initial value of the second determination pressure value P2 and the second corrected condition value, are set at values determined on the basis of the pressure variation that may occur in the first pilot pressure and the second pilot pressure due to vibration generated by the operator when controlling the operating lever and so on. By setting the first determination pressure value P1 and the second determination pressure value P2 in this manner, the operability of the hybrid construction machine can be prevented effectively from deteriorating.

Figure 3:
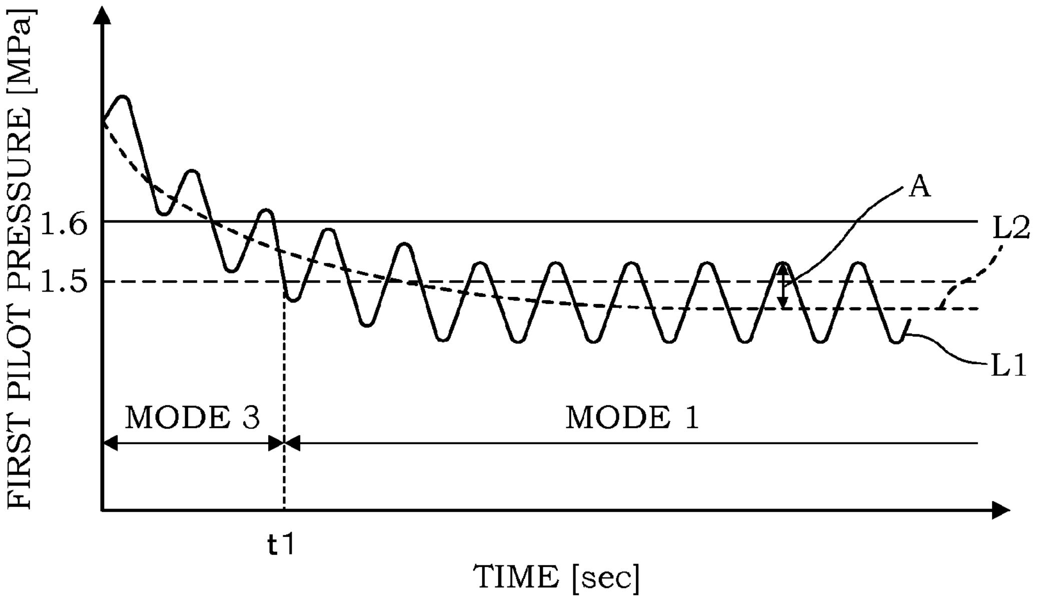
FIG. 3 is a view illustrating a method of setting a determination pressure value.

Referring to FIG. 3, the method of setting the determination pressure values will be described further. FIG. 3 is a schematic diagram relating to setting of the first determination pressure value P1. In FIG. 3, L1 is a waveform showing a measured value of the first pilot pressure, and L2 is a waveform showing the measured value of the first pilot pressure from which a pressure variation component has been removed.

As shown in FIG. 3, when the first pilot pressure decreases and the operating mode switches from MODE 3 to MODE 1 at a time t1, the first determination pressure value P1 shifts from 1.5 MPa to 1.6 MPa (the first corrected condition value). At this time, the first determination pressure value P1 is set to shift by at least a half amplitude A of the pressure variation in the first pilot pressure. By setting the first determination pressure value P1 in this manner, even when pressure variation occurs immediately after the switch to MODE 1, the measured value of the first pilot pressure does not exceed the corrected first determination pressure value P1 (1.6 MPa) due to the pressure variation. As a result, a switch from MODE 1 to another operating mode can be suppressed.

It should be noted that when the operating mode is switched to MODE 1, the first determination pressure value P1 is more preferably set to shift by at least an amplitude 2 A of the pressure variation in the first pilot pressure. When the value of the first pilot pressure excluding the pressure variation component is between the first determination pressure values P1 before and after the mode shift, a switch in the operating mode can be suppressed.

A method of setting the first determination pressure value P1 is illustrated in FIG. 3, but the second determination pressure value P2 is set using a similar method.

An embodiment of the present invention was described above, but the above embodiment is merely an example of an application of the present invention, and the technical scope of the present invention is not limited to the specific configurations of the above embodiment.

In the hybrid construction machine according to this embodiment, the first pilot pressure and the second pilot pressure are detected as condition values representing the operating condition of the actuators of the hybrid construction machine, but a signal other than the pilot pressure may be detected as the condition value representing the operating condition of the actuators. For example, the flow rate of the working oil between the throttle 8 and the control valve 5 may be detected instead of the first pilot pressure, and the flow rate of the working oil between the throttle 18 and the control valve 15 may be detected instead of the second pilot pressure.

In the hybrid construction machine according to this embodiment, the assist control is executed in accordance with the determined operating mode, but other control may be executed instead of or together with the assist control.

In the hybrid construction machine according to this embodiment, MODE 1 to MODE 3 are determined on the basis of the first pilot pressure and the second pilot pressure, but operating modes other than MODE 1 to MODE 3, for example a regeneration mode in which regeneration control is executed or the like, may be determined on the basis of the first pilot pressure and the second pilot pressure.

In the hybrid construction machine according to this embodiment, both the first determination pressure value and the second determination pressure value are corrected when MODE 1 is determined, but either one thereof may be corrected alone. Further, three or more determination pressure values may be provided to determine the operating mode. By setting a large number of operating modes, precise actuator control can be performed.

Furthermore, in the hybrid construction machine according to this embodiment, the determination pressure values may be modified even when the operating mode is not determined to be MODE 1. For example, a determination pressure value serving as a determination condition for MODE 2 may be relaxed when the operating mode is determined to be MODE 2. In this case, the determination pressure value serving as the determination condition for MODE 2 is returned to its initial value when the operating mode shifts from MODE 2 to another operating mode. As a result, erroneous determination of another operating mode can be suppressed in both MODE 1 and MODE 2.

Moreover, in the hybrid construction machine according to this embodiment, working oil is used as the working fluid, but water, a water-soluble replacement fluid, or the like may be used instead of working oil.

This application claims priority based on Japanese Patent Application No. 2013-38967, filed with the Japan Patent Office on Feb. 28, 2013, the entire contents of which are incorporated into this specification by reference.

The invention claimed is:

1. A construction machine having actuators driven by a working fluid, comprising:

a storage portion configured to store the working fluid;

first and second pumps configured to discharge the working fluid;

a first control valve configured to control communication conditions between the first pump and the storage portion and between the first pump and a first actuator of the actuators;

a second control valve configured to control communication conditions between the second pump and the storage portion and between the second pump and a second actuator of the actuators;

a first throttle configured to throttle a flow of the working fluid flowing from the first control valve to the storage portion;

a second throttle configured to throttle a flow of the working fluid flowing from the second control valve to the storage portion;

a pressure obtaining unit configured to obtain a first pressure of the working fluid between the first control valve and the first throttle and a second pressure of the working fluid between the second control valve and the second throttle;

a mode determination unit configured to determine, by comparing the first and second pressures with first and second determination pressure values respectively, a comparison result which is whether an operating mode of the construction machine is a specific operating mode in which the first actuator is driven; and a determination pressure value setting unit configured to modify the first and second determination pressure values on a basis of the comparison result of the mode determination unit;

wherein the mode determination unit determines the operating mode is the specific operating mode when the first pressure is smaller than the first determination pressure value and the second pressure is larger than the second determination pressure value, and further wherein when the mode determination unit determines that the operating mode is the specific operating mode, the determination pressure value setting unit increases the first determination pressure value and decreases the second determination pressure value.

2. The construction machine as defined in claim 1, wherein the determination pressure value setting unit is configured to set, on the basis of the comparison result of the mode determination unit, a first threshold or a second threshold, that is higher than the first threshold, as the first determination pressure value, and a third threshold or a fourth threshold, that is lower than the third threshold, as the second determination pressure value, wherein, in a case where the first threshold is set as the first determination pressure value and the third threshold is set as the second determination pressure value, the determination pressure value setting unit modifies the first determination pressure value to the second threshold and the second determination pressure value to the fourth threshold when the mode determination unit determines that the operating mode is the specific operating mode.

3. The construction machine as defined in claim 1, wherein the specific operating mode is a turning mode in which a vehicle body of the construction machine is turned using the first actuator.

4. The construction machine as defined in claim 1, wherein a difference between a pre-modification value of the first determination pressure value, which is determined before the determination pressure value setting unit modifies the first determination pressure value on the basis of the comparison result, and a post-modification value of the first determination pressure value, which is determined after the determination pressure value setting unit modifies the first determination pressure value on the basis of the comparison result, is a value determined on a basis of pressure variation that occurs in the pressure of the working fluid between the first control valve and the first throttle, and a difference between a pre-modification value of the second determination pressure value, which is determined before the determination pressure value setting unit modifies the second determination pressure value on the basis of the comparison result, and a post-modification value of the second determination pressure value, which is determined after the determination pressure value setting unit modifies the second determination pressure value on the basis of the comparison result, is a value determined on a basis of pressure variation that occurs in the pressure of the working fluid between the second control valve and the second throttle.

5. A controller provided in a construction machine having actuators driven by a working fluid, a storage portion configured to store the working fluid, first and second pumps configured to discharge the working fluid, a first control valve configured to control communication conditions between the first pump and the storage portion and between the first pump and a first actuator of the actuators, a second control valve configured to control communication conditions between the second pump and the storage portion and between the second pump and a second actuator of the actuators, a first throttle configured to throttle a flow of the working fluid flowing from the first control valve to the storage portion, and a second throttle configured to throttle a flow of the working fluid flowing from the second control valve to the storage portion, the controller comprising:

a pressure obtaining unit configured to obtain a first pressure of the working fluid between the first control valve and the first throttle and a second pressure of the working fluid between the second control valve and the second throttle;

a mode determination unit configured to determine, by comparing the first and second pressures with first and second determination pressure values respectively, a comparison result which is whether an operating mode of the construction machine is a specific operating mode in which the first actuator is driven; and a determination pressure value setting unit configured to modify the first and second determination pressure values on a basis of the comparison result of the mode determination unit;

wherein the mode determination unit determines the operating mode is the specific operating mode when the first pressure is smaller than the first determination pressure value and the second pressure is larger than the second determination pressure value, and further wherein when the mode determination unit determines that the operating mode is the specific operating mode, the determination pressure value setting unit increases the first determination pressure value and decreases the second determination pressure value.

* * * * *